United States Patent [19]
Sridhar et al.

[11] Patent Number: 5,661,771
[45] Date of Patent: Aug. 26, 1997

[54] INNER FILTER FOR A CONTROL ROD DRIVE

[75] Inventors: Bettadapur N. Sridhar, Cupertino; Edward Y. Gibo; James M. Duley, Sr., both of San Jose; Harry I. Russell, Campbell, all of Calif.

[73] Assignee: General Electric Company, Schenectady, N.Y.

[21] Appl. No.: 564,544

[22] Filed: Dec. 4, 1995

[51] Int. Cl.$^6$ ................................................ G21C 19/00
[52] U.S. Cl. ................................... 376/313; 210/232
[58] Field of Search ........................... 376/313; 210/232, 210/238; 166/157, 158, 227

[56] References Cited

U.S. PATENT DOCUMENTS 3,937,281  2/1976  Harnsberger ........................ 166/233
5,347,554  9/1994  White et al. .......................... 376/313
5,379,330  1/1995  Lovell et al. ......................... 376/313

OTHER PUBLICATIONS

"General Description of a Boiling Water Reactor", 15th Printing, Mar. 1976, Nuclear Energy Divisions, General Electric Company, pp. 2-9 through 2-16.

Primary Examiner—Daniel D. Wasil
Attorney, Agent, or Firm—Nixon & Vanderhye P.C.

[57] ABSTRACT

A filter for a control rod drive of a nuclear reactor is adapted to be attached to a connector extending upwardly from a piston. The filter includes a base portion and a perforated filter portion, the base portion having a radially open recess adapted to receive the connector in a sideways movement. The recess is bordered by a pair of spring arms of substantially square cross-section which are adapted to resiliently grip the connector upon installation.

10 Claims, 3 Drawing Sheets

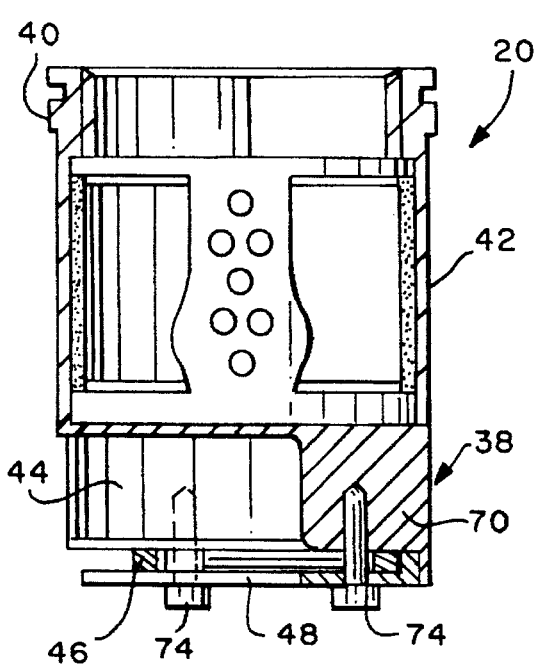
Fig. 3
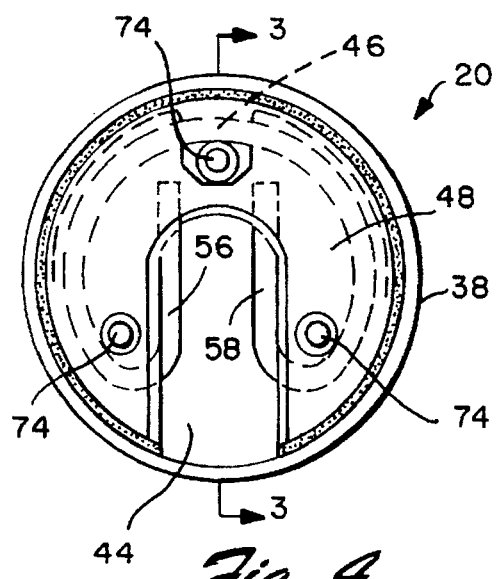
Fig. 4
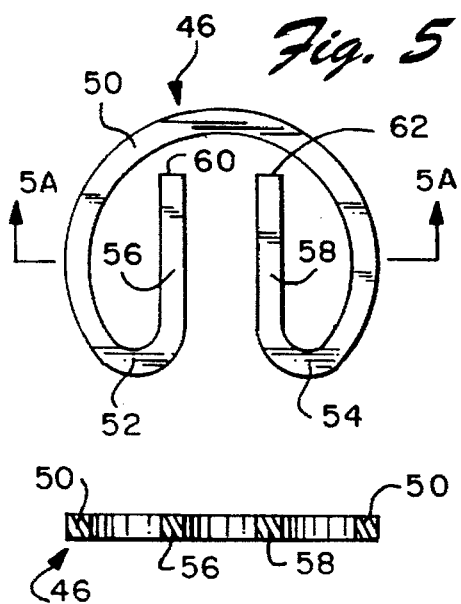
Fig. 5
Fig. 5A
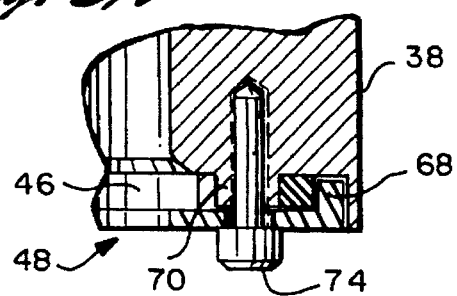
Fig. 6
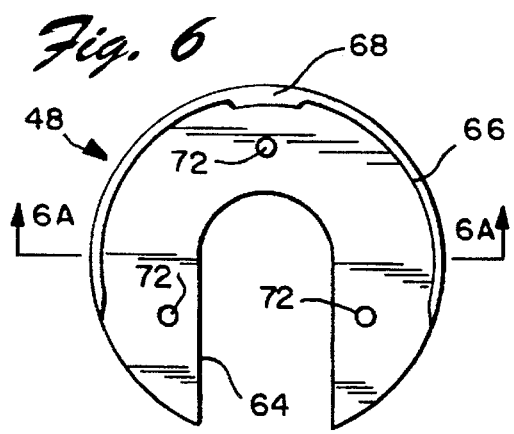
Fig. 6A

INNER FILTER FOR A CONTROL ROD DRIVE

TECHNICAL FIELD

This invention relates generally to boiling water nuclear reactors, and more specifically to an inner filter for a control rod drive system.

BACKGROUND

The reactor assembly of a boiling water nuclear reactor consists of the reactor vessel, its internal components of the core, shroud, top guide assembly, core plate assembly, steam separator and dryer assemblies and jet pumps. Also included in the reactor assembly are the control rods, control rod drive housings and the control rod drives. Each fuel assembly that makes up the core rests on an orificed fuel support mounted on top of the control rod guide tubes. Each guide tube, with its fuel support piece, bears the weight of four assemblies and is supported by a control rod drive penetration nozzle in the bottom head of the reactor vessel. The core plate provides lateral guidance at the top of each control rod guide tube. The top guide provides lateral support for the top of each fuel assembly.

Positive core reactivity control is maintained by the use of movable control rods interspersed throughout the core. These control rods thus control the overall reactor power level and provide the principal means of quickly and safely shutting down the reactor. The rods are vertically moved by hydraulically actuated, locking piston type drive mechanisms. The drive mechanisms perform both a positioning and latching function, and a scram function with the latter overriding any other signal. The drive mechanisms are bottom-entry, up-ward scramming drives which are mounted on a flanged housing on the reactor vessel bottom head. Here they cause no interference during refueling and yet they are readily accessible for inspection and servicing. Hydraulic connections to the drive mechanism are made at ports in the face of the housing flange.

The control rod drive system consists of a number of locking piston control rod drive mechanisms, a hydraulic control unit for each drive mechanism, a hydraulic power supply for the entire system and instrumentation and controls with necessary interconnections. The locking piston-type control rod drive mechanism is a double-acting hydraulic piston which uses condensate water as the operating fluid. Accumulators provide stored energy for scram. An index tube and piston, coupled to the control rod, are locked at fixed increments by a collet mechanism. The collet fingers engage notches in the index tube to prevent unintentional withdrawal of the control rod, but without restricting insertion. The drive mechanism can position the rods at intermediate increments over the entire core length. Each control rod can be uncoupled from below the vessel without removing the reactor vessel head, or with the vessel head removed for refueling, without removing the drive mechanism.

DISCLOSURE OF THE INVENTION

This invention relates to a new inner filter design for a control rod drive. More specifically, the inner filter in question lies atop a stop piston within the index tube, and with an open upper end of the filter receiving the uncoupling rod which is axially aligned with the stop piston.

The new inner filter in accordance with this invention is generally similar to the inner filter currently in use in that it includes a generally cylindrical filter portion having an upper ring adapted for sliding engagement with the interior wall of the index tube. A lower, base portion of the filter mounts a horizontally oriented, double loop spring which includes a pair of parallel arms, within the partial outer diameter of the spring, which is attached to the filter base by a mounting plate. There are several significant differences, and/or features, however, associated with this invention:

1. Square rather than round wire spring stock is used. This provides increased surface area contact below the stop piston coupling shoulder which secures the filter in a vastly improved manner.

2. The spring is significantly stiffer than the existing spring, therefore making the possibility of the filter becoming loose highly unlikely.

3. The filter is attached to the stop piston coupling from the side. It can only be installed in the attached position.

4. To enable installation, the filter is inserted before the index tube is assembled with the piston tube.

5. To rapidly remove the filter (while the index tube is still assembled in the CRD mechanism), the filter is rotated 90° using an inner filter removal tool.

6. During removal, the spring is permanently deformed, clearing the stop piston coupling ledge and making room for the filter to be removed.

7. If the spring retainer is a bolted assembly, the deformed spring can be discarded and replaced with a new spring; and the filter, after cleaning, can be reused. If the filter unit is configured as a throw-away, the entire filter can be replaced easily.

8. The spring fingers have been designed to provide an optimal force which has been established using innovative non-linear finite element analysis and which has been verified by testing.

9. The costs are comparable to those of the existing inner filter design.

In accordance with one exemplary embodiment of the invention, there is provided a filter for a control rod drive of a nuclear reactor, the filter adapted to be attached to a connector extending upwardly from a piston, comprising a base portion and a perforated filter portion, the base portion having a recess adapted to receive the connector, the recess bordered by a pair of substantially parallel spring arms of substantially square cross-section which are adapted to resiliently grip the connector upon installation.

A detailed description of the invention follows in conjunction with the drawing figures as described below.

BRIEF DESCRIPTION OF THE DRAWINGS

FIG. 3 is a side elevation, primarily in section, of the inner filter in accordance with this invention;

FIG. 3A is an enlarged detail taken from FIG. 3;

FIG. 4 is a bottom plan of the inner filter shown in FIG. 3;

FIG. 5 is a plan of a spring used in the inner filter shown in FIGS. 3 and 4;

FIG. 5A is a front elevation of the spring shown in FIG. 5;

FIG. 6 is a top plan of a spring retaining plate incorporated in the filter shown in FIGS. 3 and 4; and FIG. 6A is a section taken along the line 6A—6A of FIG. 6.

BEST MODE FOR CARRYING OUT THE INVENTION

Figure 1:
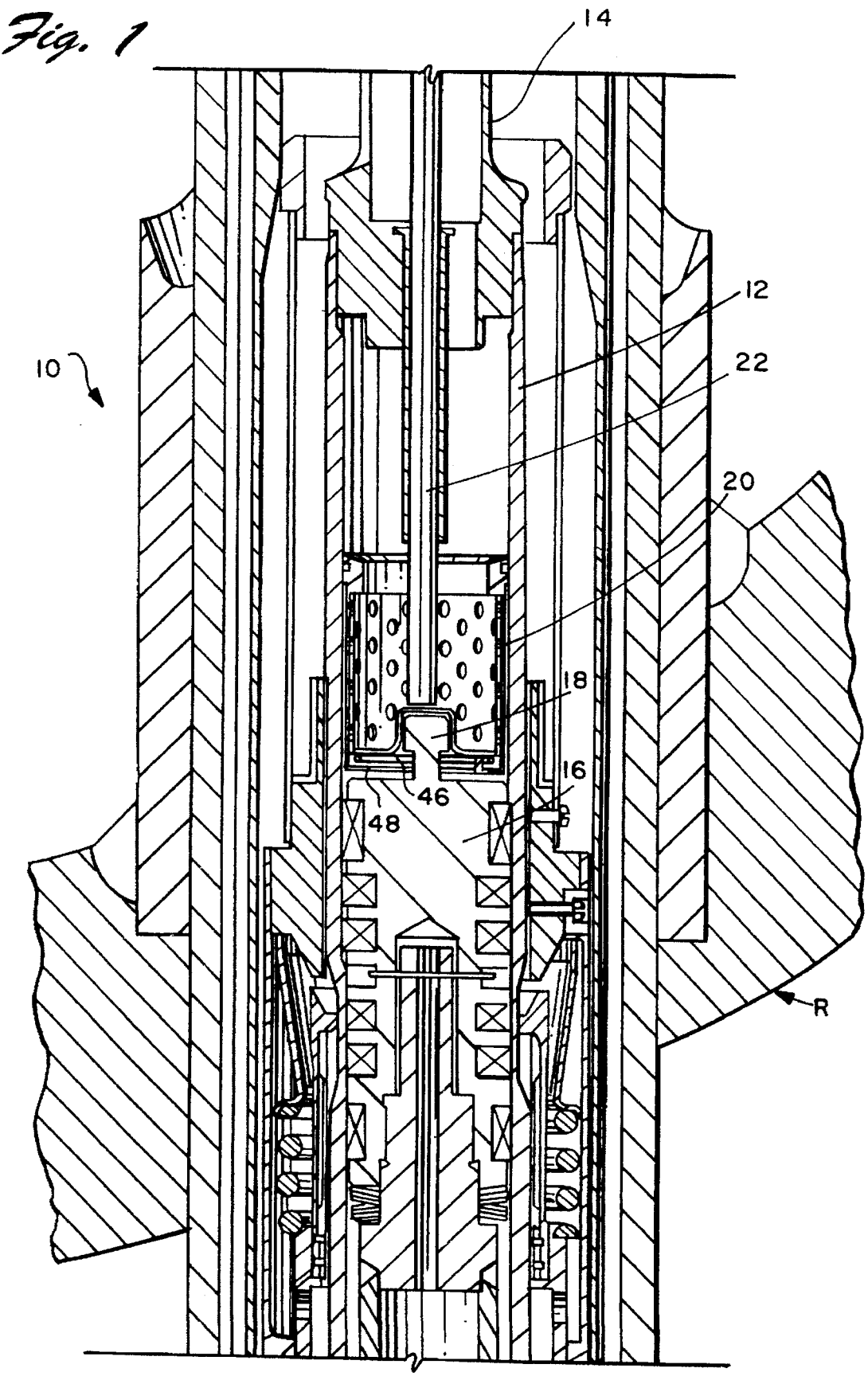
FIG. 1 is a partial cross section of a control rod drive incorporating an inner filter in accordance with the invention.

With reference initially to FIG. 1, the control rod drive 10 extends through the bottom wall of the reactor vessel R, and includes an index tube 12 extending between a main drive piston (not shown) at its lower end, and a control rod coupling 14 at its upper end. Within the index tube, there is located a fixed stop piston 16 which includes a connector 18 projecting upwardly from the top of the piston. An inner filter 20 is mounted on the stop piston 16 via the connector 18. An uncoupling rod 22 is received within the filter 20 and extends upwardly through the coupling 14 in the usual fashion.

Figure 2:
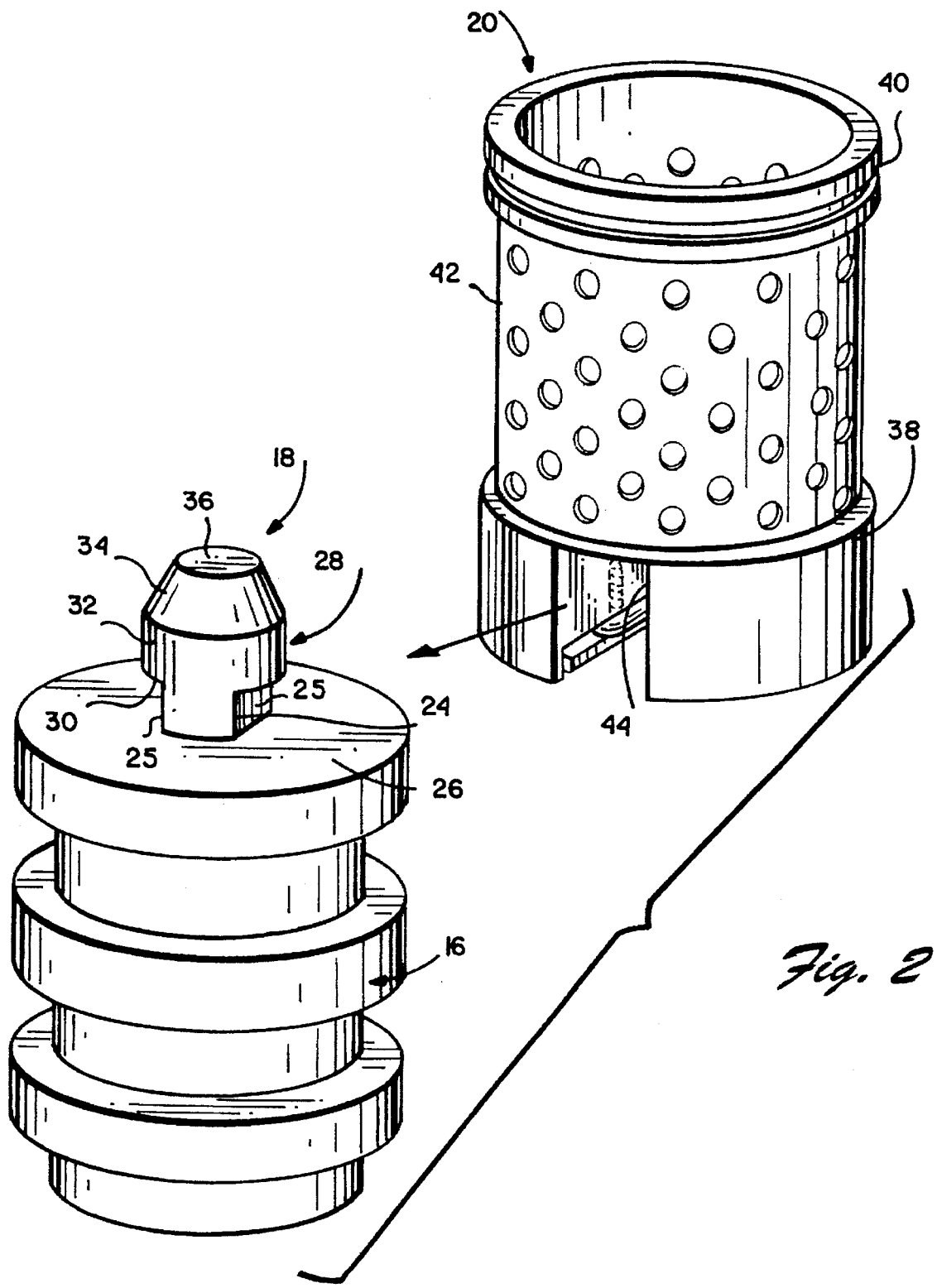
FIG. 2 is an exploded, partial perspective indicating the manner of attachment of the inner filter of this invention to the top of a stop piston.

FIG. 2 illustrates, in simplified form, the filter 20 and the manner in which it is mounted on the stop piston 16. The connector 18 is formed to include a reduced diameter stem or neck 24 projecting upwardly from the top 26 of piston 16. Flats 25 are provided on neck 24 to align the spring, and keep the filter 20 in a locked position. An enlarged head 28 sits atop the stem 24, forming an undercut, radial shoulder 30. The head 28 includes a cylindrical side wall portion 32 and a tapered crown 34, terminating in a flat top surface 36. This construction is well known and forms no part of the invention per se.

The inner filter 20 is of generally cylindrical configuration and generally includes a lower attachment or base portion 38, and an upper ring 40 and an intermediate, perforated filter portion 42. It is the lower attachment or base portion 38 which is of principal concern in this invention.

As best appreciated from FIGS. 2, 3 and 4, the lower attachment or base portion 38 of the inner filter 20 has a cylindrical side wall interrupted by a cutout or groove 44 which extends radially inwardly beyond the center of the filter (i.e., such that the filter can be mounted with its center axis aligned with the longitudinal axis of the stop piston). This groove or cut-out 44 has a width only slightly larger than the maximum outside diameter of the cylindrical side wall 32 of the connector 18. With this arrangement, the filter 20 may be attached to the stop piston connector 18 by a sideways sliding movement as can be appreciated from FIG. 2.

Returning to FIG. 1, but also referring to FIGS. 3–5, a double loop spring 46 is utilized to secure the inner filter 20 in place on the stop piston. The spring 46, best seen in FIG. 5, is sandwiched between the flat underside of the filter base portion 38 and an attachment plate 48 (see especially FIGS. 3, 4 and 6).

The spring 46 is formed to include an outer partially annular portion 50, a pair of inwardly turned loops 52 and 54, and a pair of parallel, straight arms 56, 58 terminating at respective free ends 60, 62 lying inside the partially annular portion 50. The arms 56 and 58 extend on opposite sides of the vertical longitudinal axis of the filter, and the lateral gap between the straight portions 56 and 58 is approximately 0.39±0.01 inch. The gap is designed to enable the arms 56, 58 to resiliently grasp the reduced diameter neck or stem 24 of the connector 18 when the filter is moved into the position shown in FIG. 1 and as discussed further below.

Spring 46, in accordance with this invention, is made from square spring steel stock, approximately 0.125 inch on a side, with minimum yield strength of 145,000 p.s.i.; minimum ultimate tensile strength of 200,000 p.s.i. and minimum elongation of 16%. This ensures that the twisting force during removal is neither too low (this might permit accidental removal during operation) nor too high (this would require excessive force to remove the filter).

By using square stock for the spring 46, a significant increase in surface area contact is achieved between the spring and the stop piston connector, particularly where the spring arms 56, 58 contact the both reduced diameter neck 24 and the undercut shoulder 30 of the connector 18. As a result, significantly improved attachment characteristics are gained. In accordance with this invention, the stiffness of the spring 46 is also increased to minimize any possibility of the filter 20 coming loose from the stop piston connector 18.

The spring 46 is held securely in place by the attachment plate 48 which is generally shaped to coincide with the cross sectional shape of the base portion of the filter, and as best seen in FIG. 6. Thus, the plate 48 is substantially round but with a radial cut-out 64 similar to the cut-out 44 in the base portion 38 of the filter 20. The plate 48 also has a partial flange 66—extending about a portion of its periphery, and the flange includes a more prominent thickened portion 68.

The base portion 38 of the filter is provided with three projecting, interiorly threaded bosses 70 (one shown in FIGS. 3 and 3A) spaced about the base portion and arranged to locate within the outer periphery of the spring 46 as best seen in FIG. 4. With properly aligned holes 72 in the attachment plate 48, the latter can be secured to the base portion 38 by screws 74 received within the threaded bosses 70. In this manner, the spring 46 is securely sandwiched between the plate 48 and the base portion 38, with bosses 70 preventing any unwanted movement of the spring as a whole, while leaving the parallel arms 56, 58 free to flex upon engagement with neck 24 during attachment of the filter 20 to the stop piston connector 18. Note that the thickened flange portion 68 engages the spring and restrains the latter in place between the flange portion 68 and the boss 70 (see especially FIG. 3A).

Because of the sideways installation motion previously described, the filter 20 is attached to connector 18 of the Stop portion 16 before the index tube 12 is assembled with the main piston. It is possible, however, to remove the filter while the index tube and stop piston are in the assembled relationship with the spring engaged in the flats 25 as shown in FIG. 1. This is accomplished by a specially designed removal tool. The filter is rotated so that the spring is no longer contacting the flats but is on the diameter equal to 32 and is therefore free to be removed axially. During removal, the spring 46 is permanently deformed, as it clears the undercut shoulder 24 of the connector 18. Since the plate 48 is merely bolted to the filter base portion 38, the deformed spring 46 can be discharged and replaced with a new spring. In the event the spring 46 and the plate 48 are secured to the filter permanently (by replacing screw 74 with, for example, welded dowel pins or other means), the entire filter is easily replaced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A filter for a control rod drive of a nuclear reactor, the filter adapted to be attached to a connector extending upwardly from a piston, comprising:

a base portion and a perforated filter portion, the base portion having a recess adapted to receive the connector, the recess bordered by a pair of substantially parallel spring arms of substantially square cross-section which are adapted to resiliently grip said connector upon installation.

2. The filter of claim 1 wherein said recess comprises a radial cutout which enables attachment of the filter to the connector by a sideways, sliding movement.

3. The filter of claim 2 wherein the connector includes a reduced diameter neck and an enlarged head at the upper end of the reduced diameter neck and a pair of flats defining a radial abutment shoulder therebetween, and wherein the spring arms are sized and arranged to engage said flats and the radial abutment shoulder.

4. The filter of claim 1 wherein said pair of spring arms are part of a one piece spring formed to include a partially annular portion, and a pair of loops terminating in said pair of substantially parallel spring arms.

5. The filter of claim 4 wherein said spring arms lie wholly within said partial annular portion, and extend on opposite sides of a vertical center axis of the filter.

6. The filter of claim 5 wherein said spring is sandwiched between a lower surface of said base portion and a substantially flat attachment plate.

7. The filter of claim 6 wherein said plate is secured to said base portion by a plurality of fasteners located within the outer peripheral portion such that said peripheral portion is: fixed but said spring arms are free to flex.

8. The filter of claim 2 wherein said radial groove has a length sufficient to permit said filter to be axially aligned with the piston.

9. The filter of claim 1 wherein said spring arms are laterally spaced apart a distance less than a width dimension of said radial cutout.

10. The filter of claim 1 wherein said spring arms comprise free ends of a loop spring having a minimum yield strength of 145000 psi and a minimum ultimate tensile strength of 200,000 psi.

* * * * *